US012023950B2

(12) United States Patent
Larson

(10) Patent No.: US 12,023,950 B2
(45) Date of Patent: Jul. 2, 2024

(54) POP-UP OBJECT WITH DOUBLE CANOPY

(71) Applicant: American Greetings Corporation, Cleveland, OH (US)

(72) Inventor: Seth Larson, Lakewood, OH (US)

(73) Assignee: American Greetings Corporation, Cleveland, OH (US)

( * ) Notice: Subject to any disclaimer, the term of this patent is extended or adjusted under 35 U.S.C. 154(b) by 0 days.

(21) Appl. No.: 17/948,529

(22) Filed: Sep. 20, 2022

(65) Prior Publication Data

US 2024/0092112 A1 Mar. 21, 2024

(51) Int. Cl.
*B42D 15/04* (2006.01)

(52) U.S. Cl.
CPC .................................. *B42D 15/045* (2013.01)

(58) Field of Classification Search
CPC .... G09F 1/06; G09F 1/08; A63H 3/08; A63H 33/38; B42D 15/04; B42D 15/042; B42D 15/045
See application file for complete search history.

(56) References Cited

U.S. PATENT DOCUMENTS 1,841,041 A * 1/1932 Lowenstein .............. G09F 1/08 40/539
3,415,501 A 11/1941 Klein et al.
2,696,690 A 5/1951 Kellerer
4,531,319 A 7/1985 Saxton
4,885,859 A * 12/1989 Gasser ................. B42D 15/042 40/539
8,695,242 B2 * 4/2014 Nelson ...................... G06F 1/00 40/124.03
9,643,443 B2 5/2017 Bogdanski et al.
9,738,109 B2 8/2017 Marsh et al.
9,796,203 B2 10/2017 Shlonsky et al.
9,836,997 B1 12/2017 Bandrup
2007/0289184 A1 * 12/2007 Cheng .................. B42D 15/045 40/124.06
2010/0311301 A1 * 12/2010 Park ....................... A63H 33/38 446/148
2014/0144052 A1 5/2014 Guo et al.
2016/0114613 A1 4/2016 Bogdanski et al.

FOREIGN PATENT DOCUMENTS

CN 207173103 U * 4/2018
GB 2579714 1/2020
GB 2601230 5/2022
KR 2009028098 A * 3/2009

* cited by examiner

*Primary Examiner* — Cassandra Davis
(74) *Attorney, Agent, or Firm* — Christine Flanagan

(57) ABSTRACT

A pop-up object with double canopies includes a lower canopy that serves as a base for the pop-up object, an upper canopy, and a pop-up scene positioned between the upper and lower canopies. The upper canopy, lower canopy, and pop-up scene can simultaneously move between a first, folded, flat position and a second, unfolded, upright position.

19 Claims, 11 Drawing Sheets

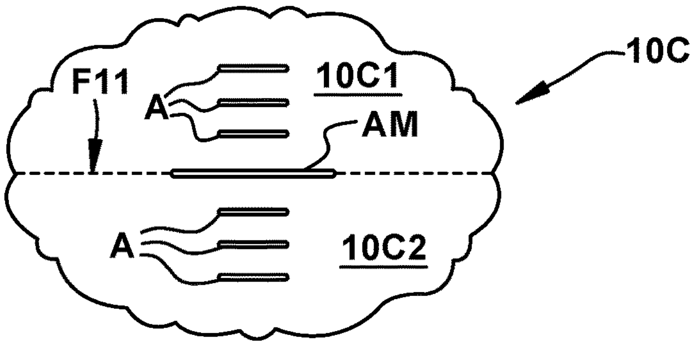
FIG. 16
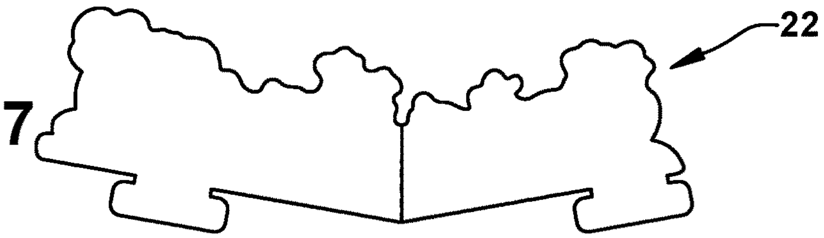
FIG. 17
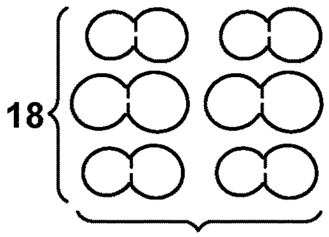
FIG. 18
FIG. 19
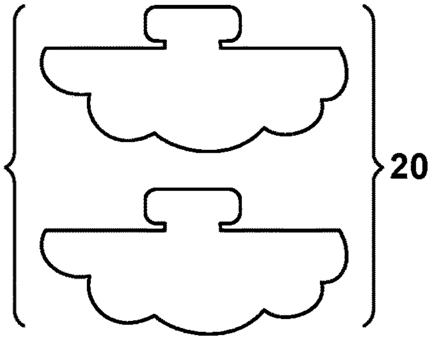
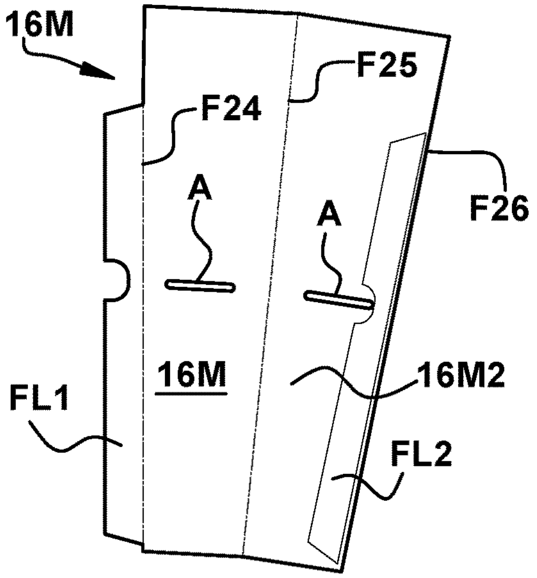
FIG. 20
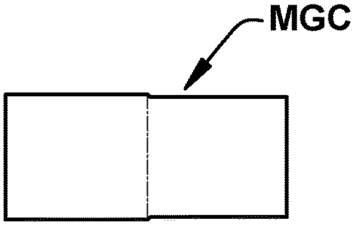
FIG. 21
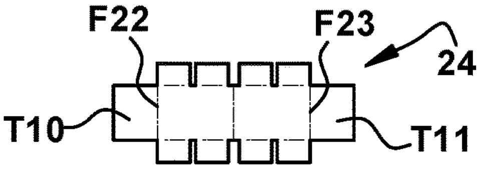
FIG. 22

POP-UP OBJECT WITH DOUBLE CANOPY

RELATED APPLICATIONS

There are no applications related to this application.

FIELD OF THE INVENTION

This invention is in the field of social expression products, such as greeting cards. More particularly, this invention is directed to a pop-up element with a pop-up scene positioned between two separate pop-up elements.

SUMMARY OF THE INVENTION

In one embodiment, the pop-up element with double canopy includes a first canopy comprising an oval base, internal structure and top panel, the first canopy movable between a first position, wherein it is folded flat and a second position wherein it is unfolded into a three-dimensional structure, a second canopy comprising an oval base and internal structure, the second canopy movable between a first position, wherein it is fold flat and a second position wherein it is unfolded into a three-dimensional structure, a center panel that extends between and separating the first canopy and the second canopy, a 3D scene comprising a plurality of panels attached to the first canopy, and a plurality of hanging panels suspended from the second canopy, where the first canopy, the second canopy and the 3D scene are simultaneously moved between the first and second positions.

In another embodiment, the pop-up element with double canopy includes a first canopy comprising an oval base, internal structure and top panel, the first canopy movable between a first position, wherein it is folded flat and a second position wherein it is unfolded into a three-dimensional structure, a second canopy comprising an oval base and internal structure, the second canopy movable between a first position, wherein it is fold flat and a second position wherein it is unfolded into a three-dimensional structure, a center panel that extends between and separating the first canopy and the second canopy, a 3D scene comprising a plurality of panels attached to the first canopy, and a plurality of hanging panels suspended from the second canopy, where the first canopy, the second canopy and the 3D scene are simultaneously moved between the first and second positions.

In still another embodiment, the pop-up element with double canopy includes a first pop-up element, a second pop-up element, and a pop-up 3D scene located between the first pop-up element and the second pop-up element, where the first pop-up element, the second pop-up element and the pop-up 3D scene each simultaneously move between a first, substantially flat, collapsed position and a second, upright, 3-dimensional position.

DESCRIPTION OF THE DRAWINGS

FIG. 16 is a top view of the top panel of the bottom canopy.

FIG. 17 is a front view of decorative panels.

FIG. 18 is a front view of hanging panels.

FIG. 19 is a front view of decorative panels.

FIG. 20 is a perspective view of the main panel of the 3D scene.

FIG. 21 is a front view of the mini greeting card.

FIG. 22 is a strut or connection tab.

DETAILED DESCRIPTION OF PREFERRED AND ALTERNATE EMBODIMENTS

Figure 1:
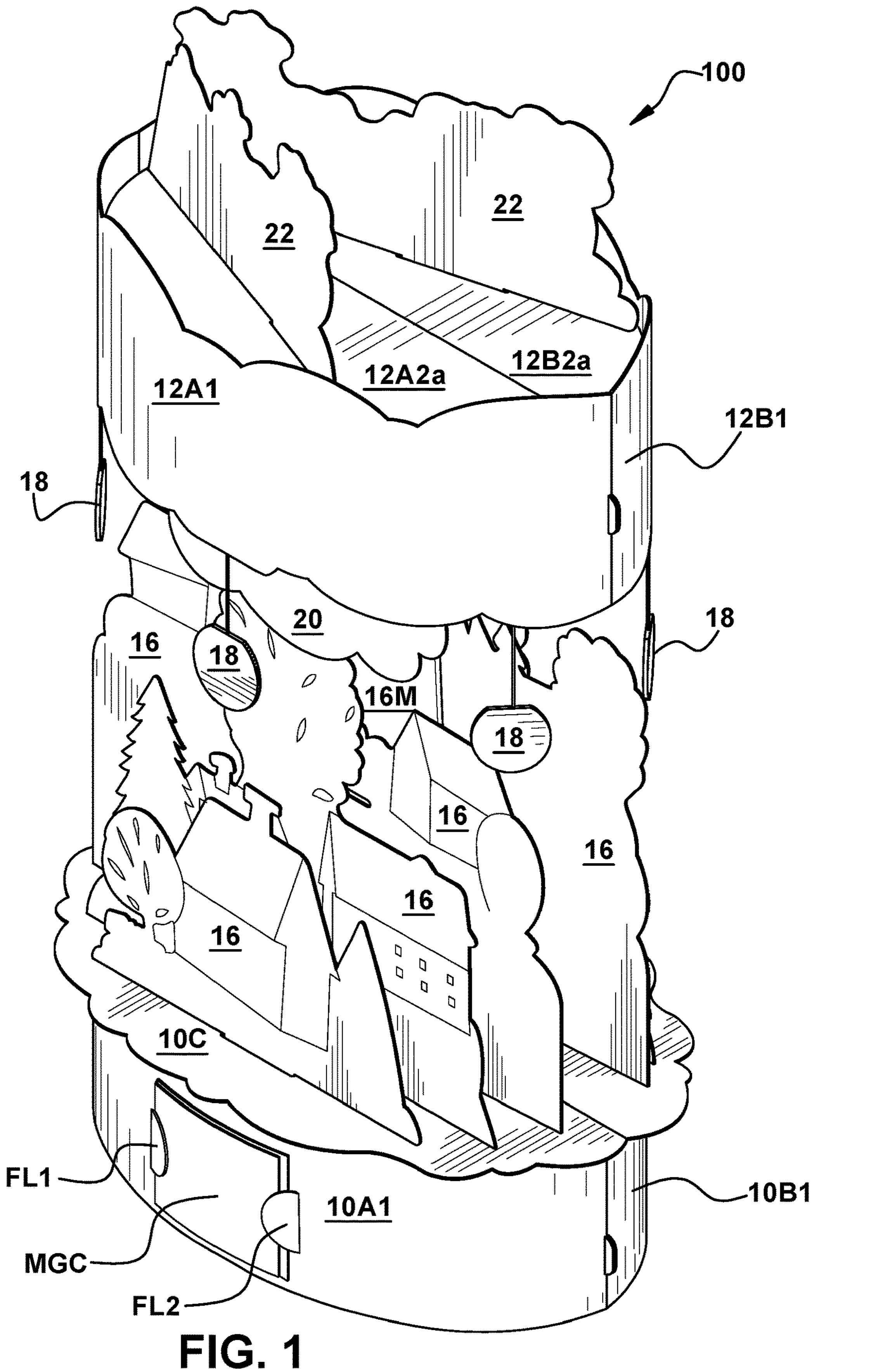
FIG. 1 is a perspective view of the pop-up object with double canopy of the present invention, in an open/unfolded position.
Figure 2:
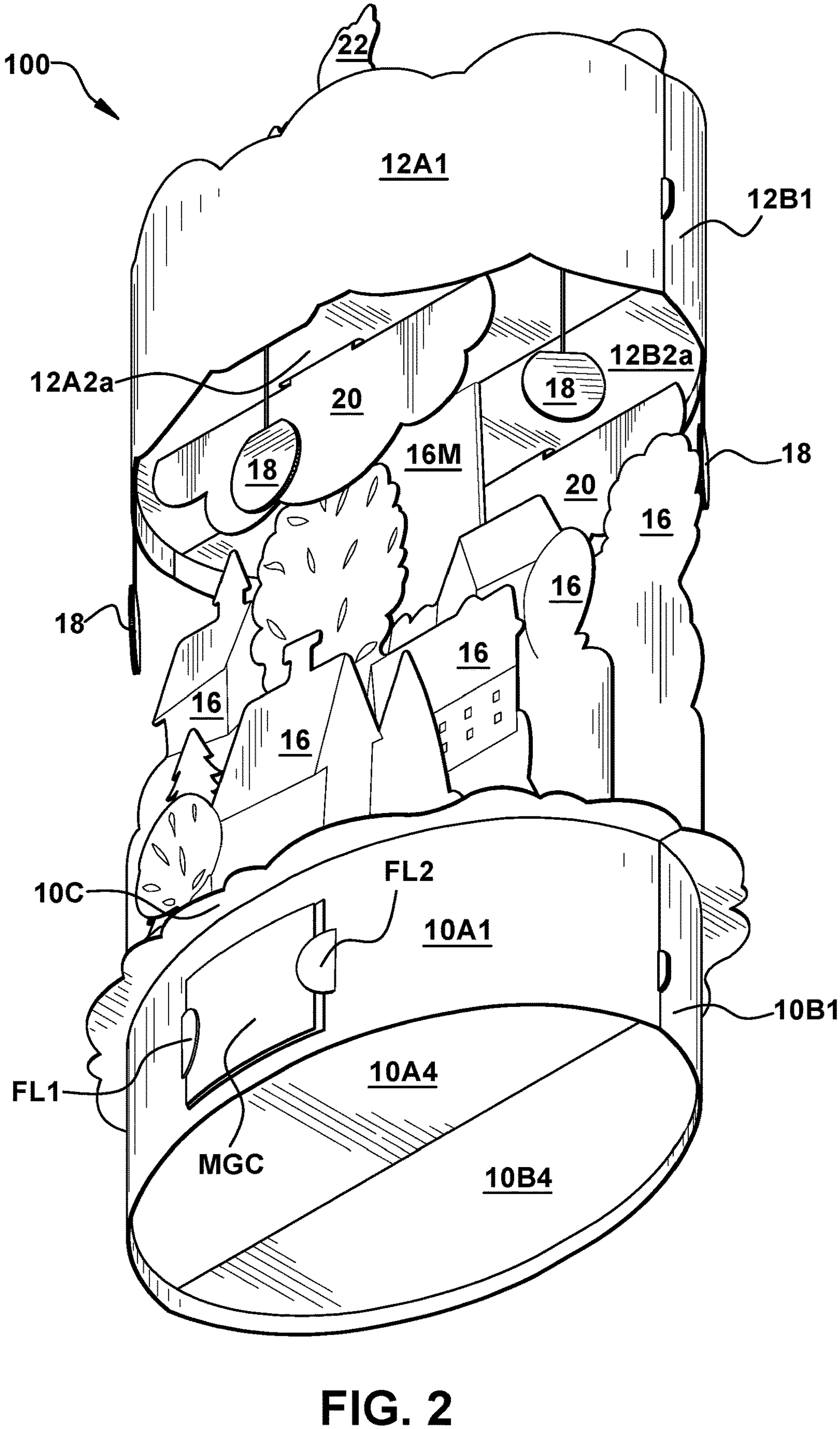
FIG. 2 is a alternate perspective view of the FIG. 1
Figure 3:
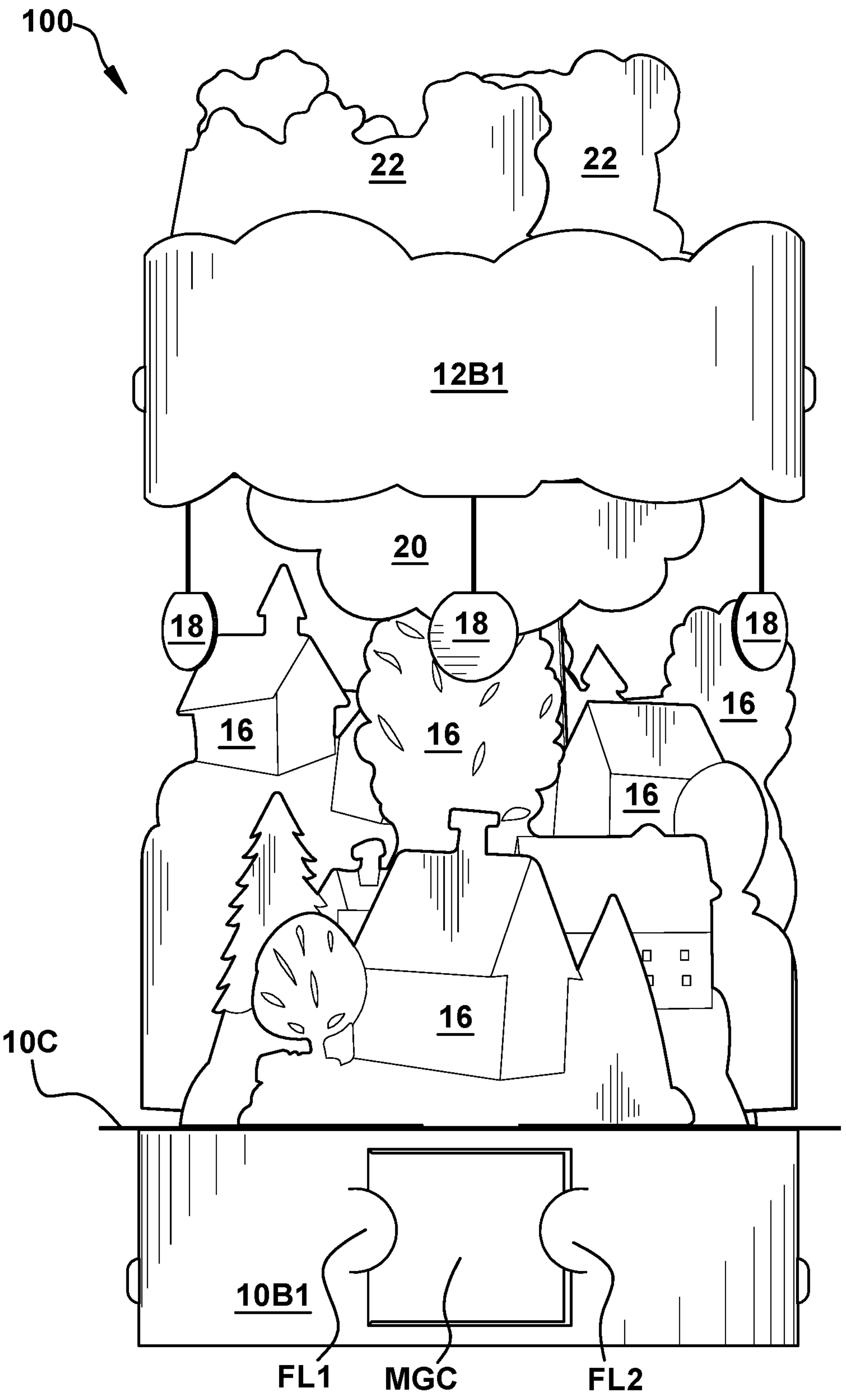
FIG. 3 is a front view of FIG. 1.

The pop-up of the present disclosure and related inventions is a 360-degree diorama having a lower canopy 10, an upper canopy 12 and a pop-up scene 16 sandwiched between the lower canopy 10 and the upper canopy 12. This pop-up 100 can move between two positions—a first position, wherein the pop-up 100 is folded into a closed, substantially flat configuration, and a second position, wherein the pop-up 100 is unfolded into an open, fully upstanding configuration. The lower canopy 10 and the upper canopy 12 of the greeting card 100 have a substantially similar construction with a few minor details.

Lower Canopy

The lower canopy 10 serves as the base for the pop-up 100 of the present disclosure and related inventions. It includes two sides 10A and 10B that are almost mirror images of one another. The two sides 10A, 10B are eventually combined to form the lower canopy structure 10. The lower canopy 10 includes two (2) substantially rectangular base subpanels 10A1, 10B1, two (2) substantially triangular subpanels 10A2, 10B2, two substantially rectangular subpanels 10A3, 10B3; two (2) domed subpanels 10A4, 10B4, and four (4) mounting or attachment tabs T1, T2, T3, T4. The first and second subpanels 10A, 10B each have a first long side L1, L3 opposite a second long side L2, L4 and a first short side S1, S3 opposite a second short side S2, S4, with the two short sides S1, S2, S3, S4 extending between the two long sides L1, L2, L3, L4. Each of the first and second subpanels 10A, 10B have a front surface and a rear surface opposite the front surface. The first subpanel 10A contains two flaps FL1, FL2 located proximate to the horizontal center of the first subpanel 10A. These two flaps FL1, FL2 operate to retain a mini greeting card MGC therein, as shown in the Figures. The second subpanel 10B contains two mounting tabs T1, T2, one mounting tab located at each opposing end of the second subpanel 10B1. Mounting tab T1 is attached to the second subpanel 10B1 along fold line F1 and mounting tab T2 is attached to the second subpanel 10B1 along fold line F2. The second subpanel 10B1 also contains two minor slots SL1, SL2 located at each opposite end of the second subpanel 10B1, proximate to the two mounting tabs T1, T2.

Both the first and second subpanels 10A1, 10B1 of the lower canopy 10 are attached to a substantially triangular subpanel 10A2, 10B2 along a fold lines F3, F4, respectively. The substantially triangular subpanels 10A2, 10B2 contain one or more horizontal openings or apertures A thereon. The substantially triangular subpanels 10A2, 10B2 are connected to substantially rectangular subpanels 10A3, 10B3, along fold lines F5, F6, respectively. Each of the substantially rectangular subpanels 10A3, 10B3 contain two minor protrusions P1, P2, P3, P4 thereon on opposing ends thereof. The substantially rectangular subpanels 10A3, 10B3 are connected to a domed subpanel 10A4, 10B4, along fold lines F7, F8, respectively. The two (2) substantially domed subpanels are attached to attachment panels T3, T4 along fold lines F9, F10, respectively.

The two subpanels 10A, 10B are attached together by first folding mounting tabs T1, T2 on the second subpanel 10B along fold lines F1, F2 and then gluing said mounting tabs T1, T2 to the inside surface of the first subpanel 10A, proximate to distal short ends S1, S2. The rectangular subpanels 10A3, 10B3 are glued together, creating a two-layered single panel that is partially attached. Tabs T3 and T4 are folded downward along fold lines F9 and F10, respectively. The outer surface of tab T3 is glued to the inside surface of subpanel 10A1, proximate to long side L2. The outer surface of tab T4 is glued to the inside surface of subpanel 10B1, proximate to long side L4.

The lower canopy 10 additionally includes a top panel 10C. The top panel 10C contains a bisecting fold line F11 that runs horizontally, creating subpanels 10C1 and 10C2. Each of the subpanels 10C1 and 10C2 contain one or more elongate openings A thereon. These openings A should align with the openings located on substantially triangular subpanels 10A2 and 10B2. Also, a major opening AM is contained along the horizontal center of fold line F11. Subpanel 10C1 of the top panel is attached to the substantially triangular subpanel 10A2 and subpanel 10C2 of the top panel is attached to the substantially triangular subpanel 10B2 with the bisecting fold line F11 placed directly over fold lines F5 and F6 (of the now attached rectangular subpanels 10A3 and 10B3). The top panel 10C may contain non-linear edges, such as, for example, scalloped edges, as shown in the Figures.

In a first or folded position, the top panel is folded downward along fold lines F7 and F8, such that subpanels 10C1 and 10C2 are parallel to one another (and overlap one atop the other) and domed subpanels 10A4 and 10B4 are folded downward along fold lines F7 and F8 such that domed subpanels 10A4 and 10B4 are parallel to one another (and overlap one another). The first and second subpanels 10A1, 10B1 of the lower canopy 10 are folded about fold lines F1 and F2 such that they are parallel to one another. The lower canopy 10 can move from this first, folded position to a second, unfolded position by placing downward pressure on the top panel 10C and/or subpanels 10A3 and 10B3 (which are glued together). In the second, unfolded position, the top panel 10C is unfolded along fold lines F7 and F8, such that subpanels 10C1 and 10C2 create a flat surface, whereby they lie in the same plane. The domed subpanels 10A4 and 10B4 are also unfolded about fold lines F1 and F2 such that subpanels 10A4 and 10B4 create a flat surface, whereby they lie in the same plane. Subpanels 10A3 and 10B3 (which are glued together) span between the plane containing subpanels 10A4 and 10B4 and the plane containing the top panel 10C, being perpendicular thereto. Subpanels 10A1 and 10B1 are unfolded along fold lines F1 and F1 such that they create an substantially oval-shaped base, surrounding subpanels 10A2, 10B2, 10A3, 10B3, 10A4, and 10A5. The two minor protrusions (P1/P3 and P2/P4) located at the sides of rectangular subpanels 10A3 and 10A4 slide into the minor slots S1, S2 located on subpanel 10B1 to aid in keeping the pop-up 100 in the second, unfolded position.

Upper Canopy

Figure 23:
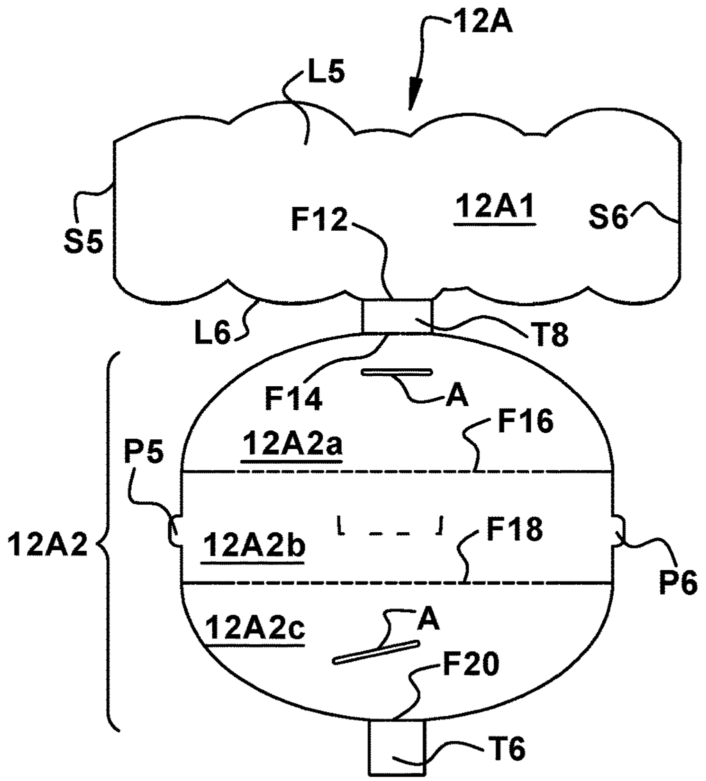
FIG. 23 is a first upper canopy sub-panel.
Figure 24:
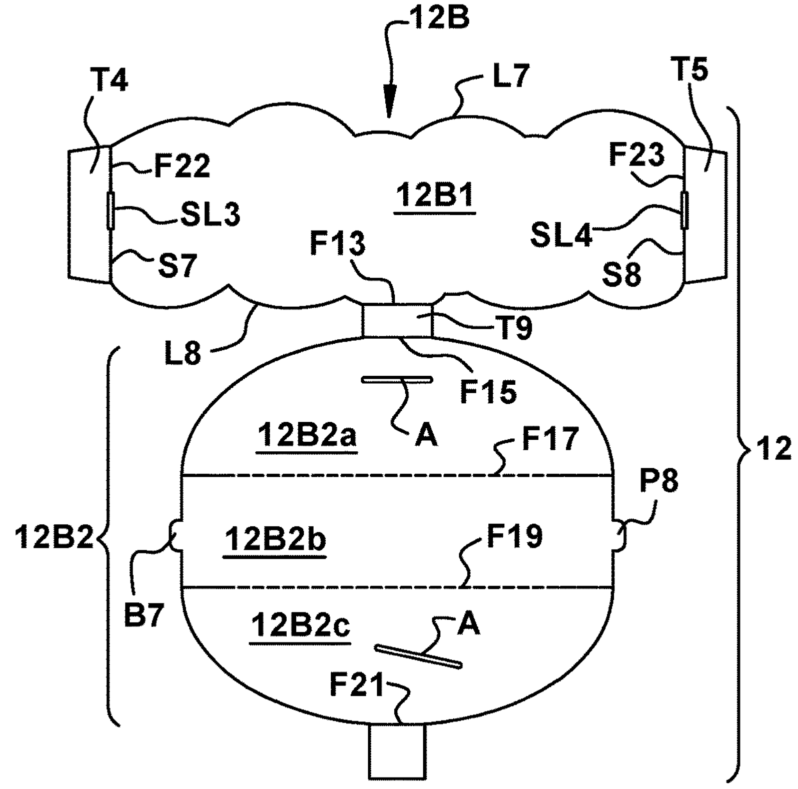
FIG. 24 is a second upper canopy sub-panel.
Figure 25:
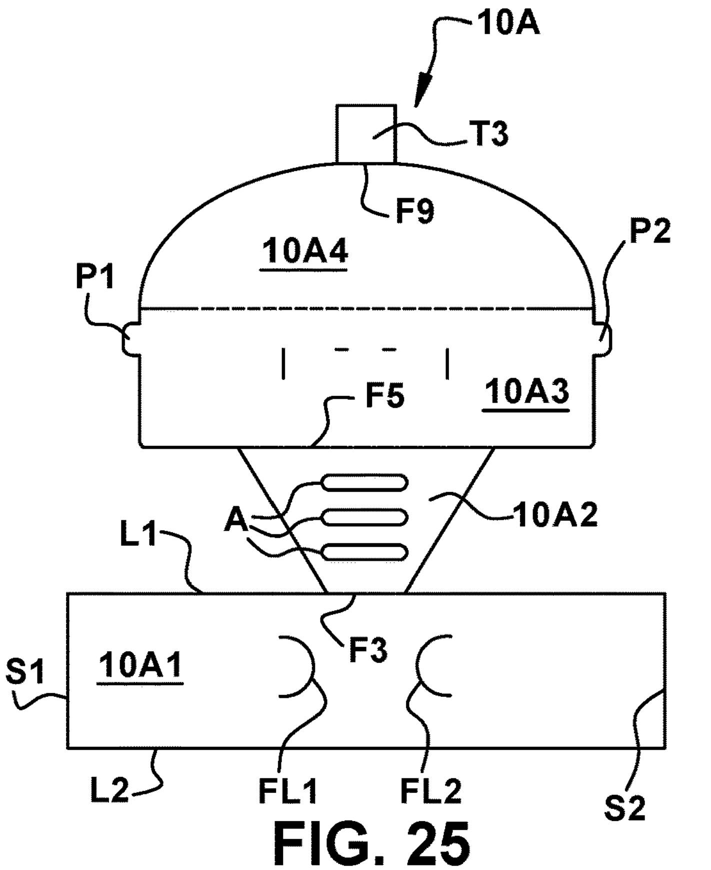
FIG. 25 is a first lower canopy sub-panel.
Figure 26:
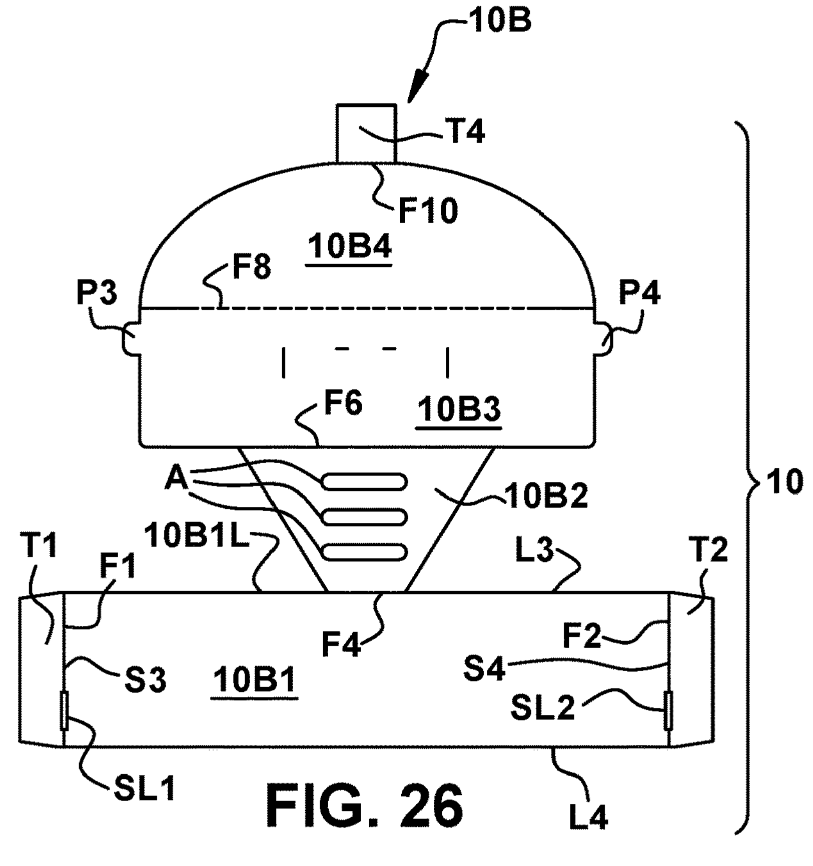
FIG. 26 is a second lower canopy sub-panel.

The upper canopy 12 portion of the pop-up with double canopy 100 of the present disclosure and related inventions is, as noted above, very similar to the construct of the lower canopy 10. It includes two sides 12A, 12B that are almost mirror images of one another. The two sides 12A, 12B are eventually combined to form the upper canopy structure 12. The upper canopy 12 contains two (2) substantially rectangular subpanels 12A1, 12B1, two (2) substantially round/oval subpanels 12A2, 12B2, four (4) attachment tabs T4, T5, T6, T7, and two (2) connection tabs T8, T9. The two (2) substantially rectangular subpanels 12A1, 12B1 each have a first long side L5, L7 opposite a second long side L6, L8 and a first short side S5, S7, opposite a second short side S6, S8, with the two short sides S5, S6, S7, S8 extending between two long sides L5, L6, L7, L8. Each of the first and second subpanels 12A, 12B have a front surface and a rear surface opposite the front surface. The two (2) substantially rectangular subpanels 12A1 and 12B1 are attached to connection tabs T8 and T9 along fold lines F12 and F13. Connection tabs T8 and T9 are attached to the two (2) round/oval subpanels 12A2, 12B2 along fold lines F14 and F15, respectively. Each round/oval subpanel 12A2, 12B2 are further divided by two horizontal fold lines running F16, F17, F18, F19 through each subpanel 12A2, 12B2, respectively to create three (3) sub-sub-panels 12A2*a*, 12A2*b*, and 12A2*c* on subpanel 12A2 and sub-sub-panels 12B2*a*, 12B2*b*, and 12B2*c*. The two (2) round/oval subpanels 12A2*c* and 12B2*c* are attached to attachment tabs T6 and T7 along fold lines F20 and F21, respectively. Subpanel 12B1 contains two attachment tabs T4 and T5 which are attached to the two (2) short sides of subpanel 12B1 along fold lines F22 and F23, respectively. Subpanels 12A1 and 12B1 may contain non-linear edges, such as, for example, scalloped edges, as shown in FIGS. 23 and 24. Subpanel 12B1 additionally contains two slots SL3, SL4 at opposing ends of subpanel 12B1, proximate to attachment tabs T4 and T5. Subpanels 12A2*a* and 12B2*a* each contain one or more openings A thereon, which are aligned with one another. Subpanels 12A2*b* and 12B2*b* each contain minor protrusions P5/P6 and P7/P8 located at opposing ends thereof. Subpanels 12A2*c* and 12B2*c* each contain one or more openings A thereon, which are aligned with one another.

The two subpanels 12A, 12B are attached together by folding mounting tabs T4, T5 on the second subpanel 12B1 along fold lines F22, F23 and then gluing said mounting tabs T4, T5 to the inside surface of the first subpanel 12A1, proximate to distal short ends S5, S6. Panels 12A2 and 12B2 are glued together (one atop the other). Tabs T6 and T7 are folded downward along fold lines F19 and F20, respectively. The outer surface of tab T6 is glued to the inside surface of subpanel 12A1, proximate to long side L5. The outer surface of tab T7 is glued to the inside surface of subpanel 12B1, proximate to long side L7.

In a first or folded position, subpanels 12A2*a* and 12B2*a* are parallel to one another (and overlap one atop the other). Subpanels 12A2*a* and 12B2*a* are folded downward along fold lines F16 and F17 such that they are parallel to one another (and overlap one atop the other). Subpanels 12A2*c*, 12B2*c* are folded downward along fold lines F18 and F19 such that they are parallel to one another (and overlap one atop the other). As with the lower canopy 10, the upper canopy 12 can move from this first, folded position to a second, unfolded position by placing downward pressure on the subpanels 12A2*b* and 12B2*b* (which are glued together). In the second, unfolded position, subpanels 12A2*a* and 12B2*a* are unfolded about fold lines F16 and F17 such that they create a flat surface and whereby they lie in the same plane. Subpanels 12A2*c* and 12A2*c* are unfolded about fold lines F18 and F19 such that create a flat surface and whereby they lie in the same plane. Subpanels 12A2*b* and 12B2*b* (which are glued together) span between the plane containing subpanels 12A2*a* and 12B2*a* and the plane containing subpanels 12A2*c* and 12B2*c*, being perpendicular thereto. Subpanels 12A1 and 12B1 are unfolded along fold lines F22 and F23 such that they create a substantially oval-shaped frame surrounding subpanels 12A2*a*, 12B2*a*, 12A2*b*, 12B2*b*, 12A2*c*, and 12B2*c*. The two minor protrusions (P5/P7 and P6/P8) located at the sides of subpanels 12A2*b* and 12B2*b* slide into the minor slots SL3, SL4 located on subpanel 12B1 to aid in keeping the upper pop-up in the second, unfolded position.

Pop-Up Scene

Figure 4:
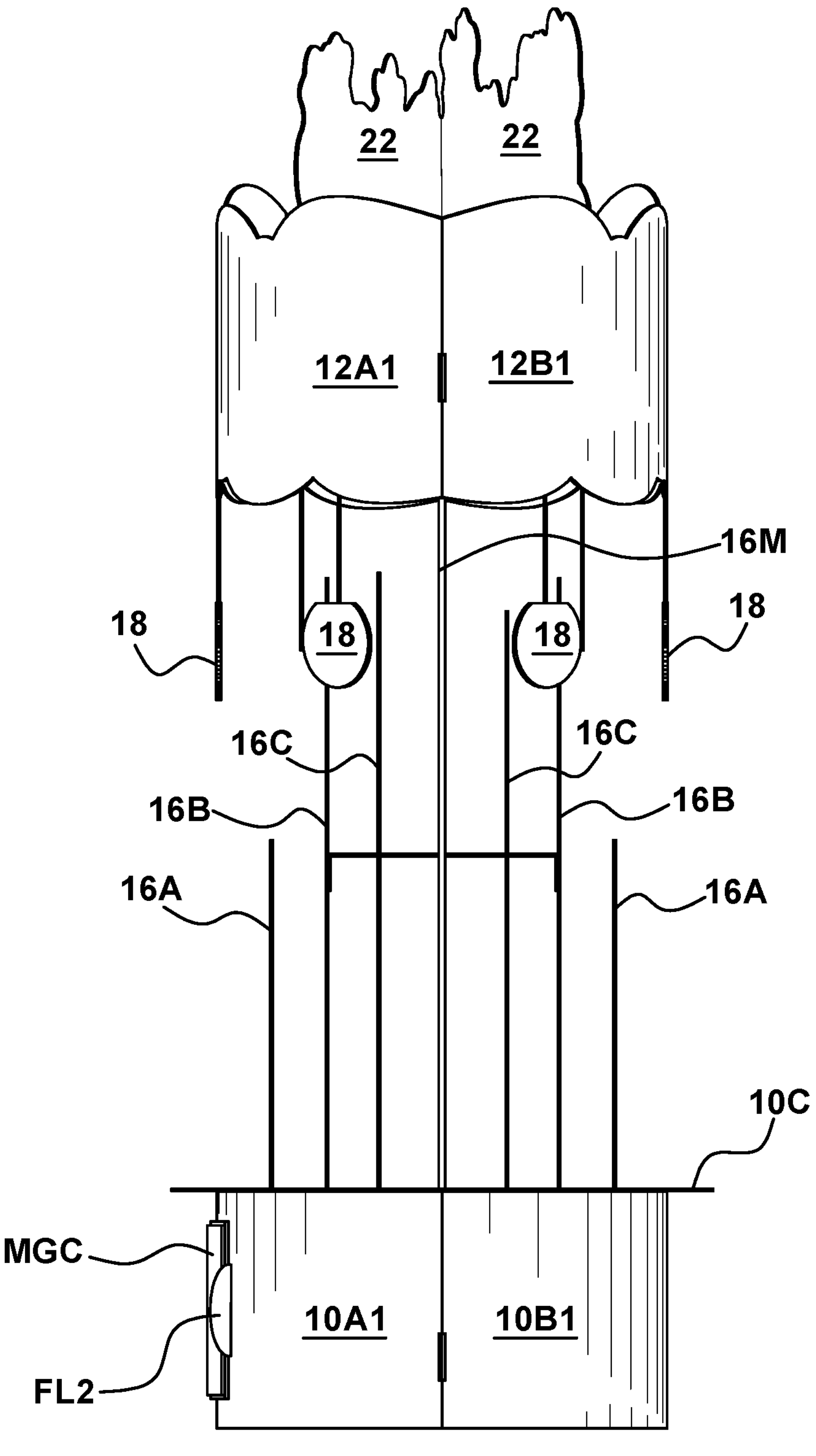
FIG. 4 is a right side view of FIG. 1.
Figure 5:
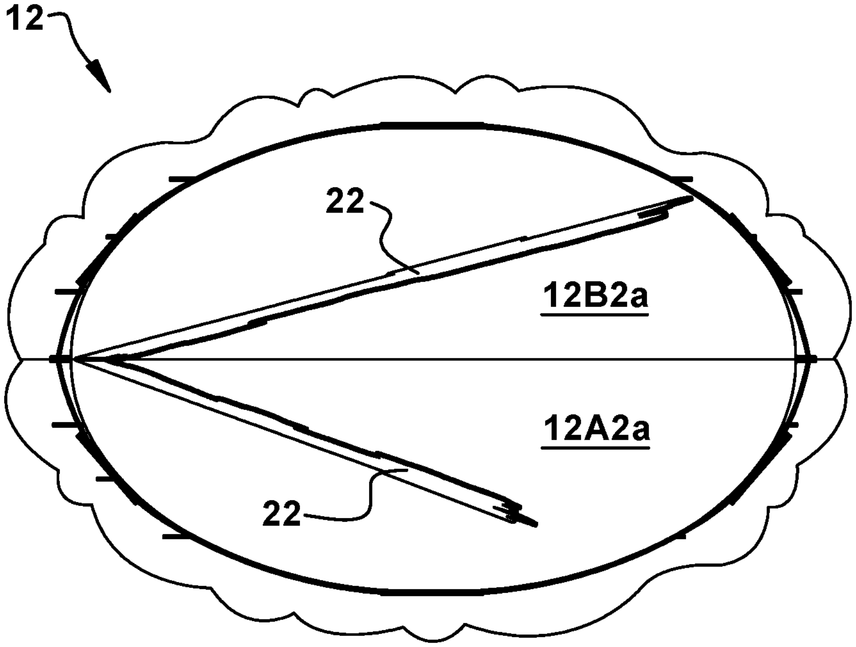
FIG. 5 is a top-down view of FIG. 1.
Figure 6:
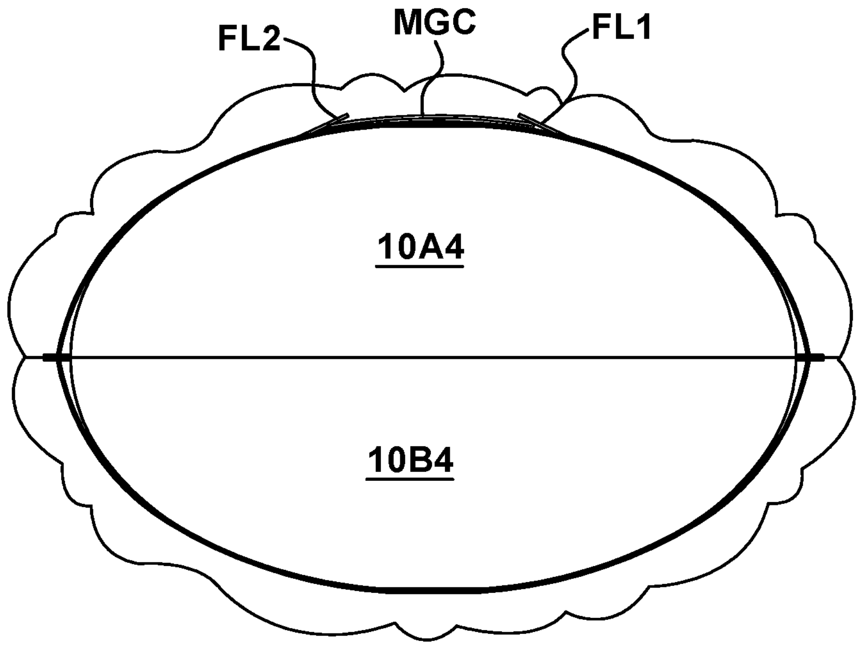
FIG. 6 is a bottom-up view of FIG. 1.
Figure 7:
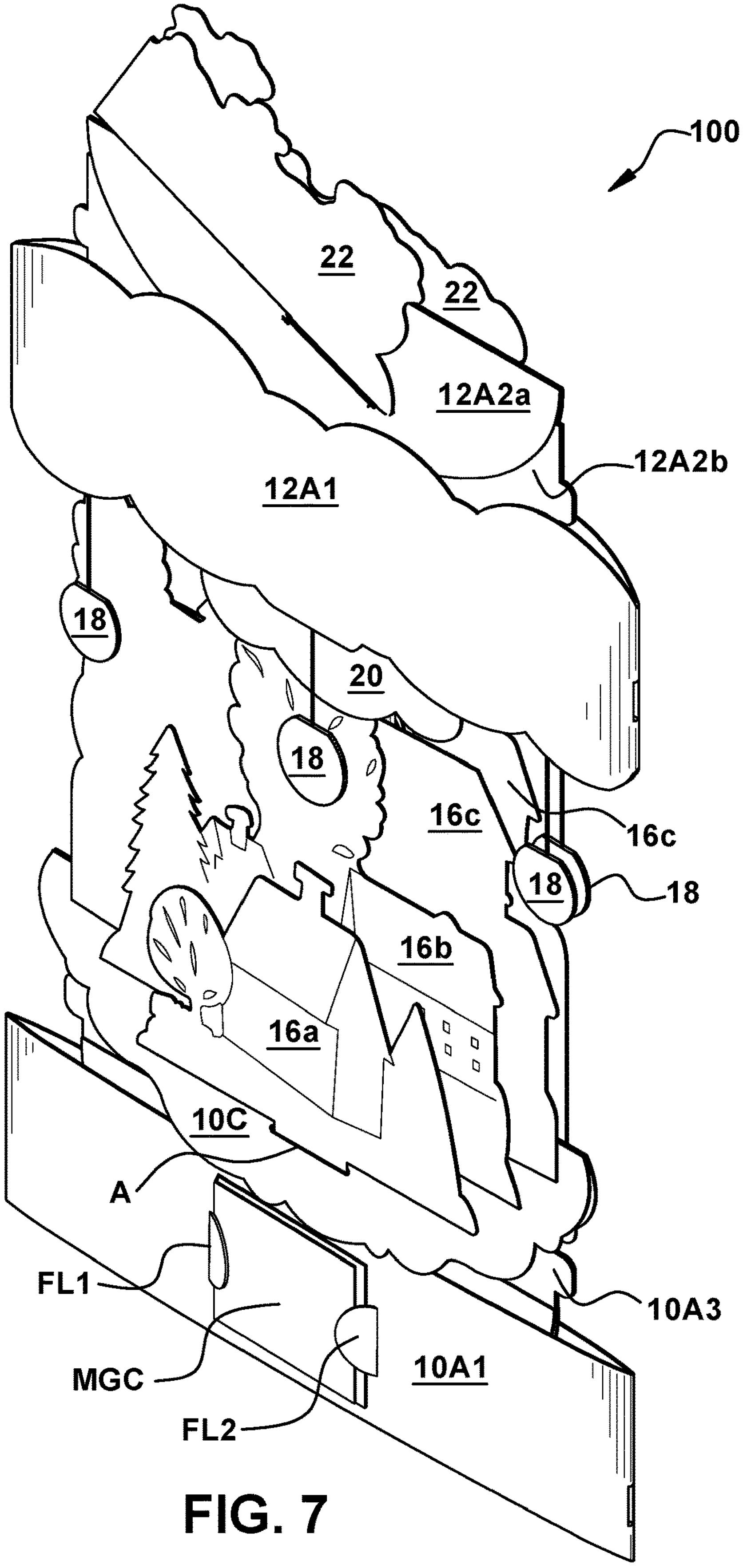
FIG. 7 is a perspective view of FIG. 1, in a closed/folded position.
Figure 8:
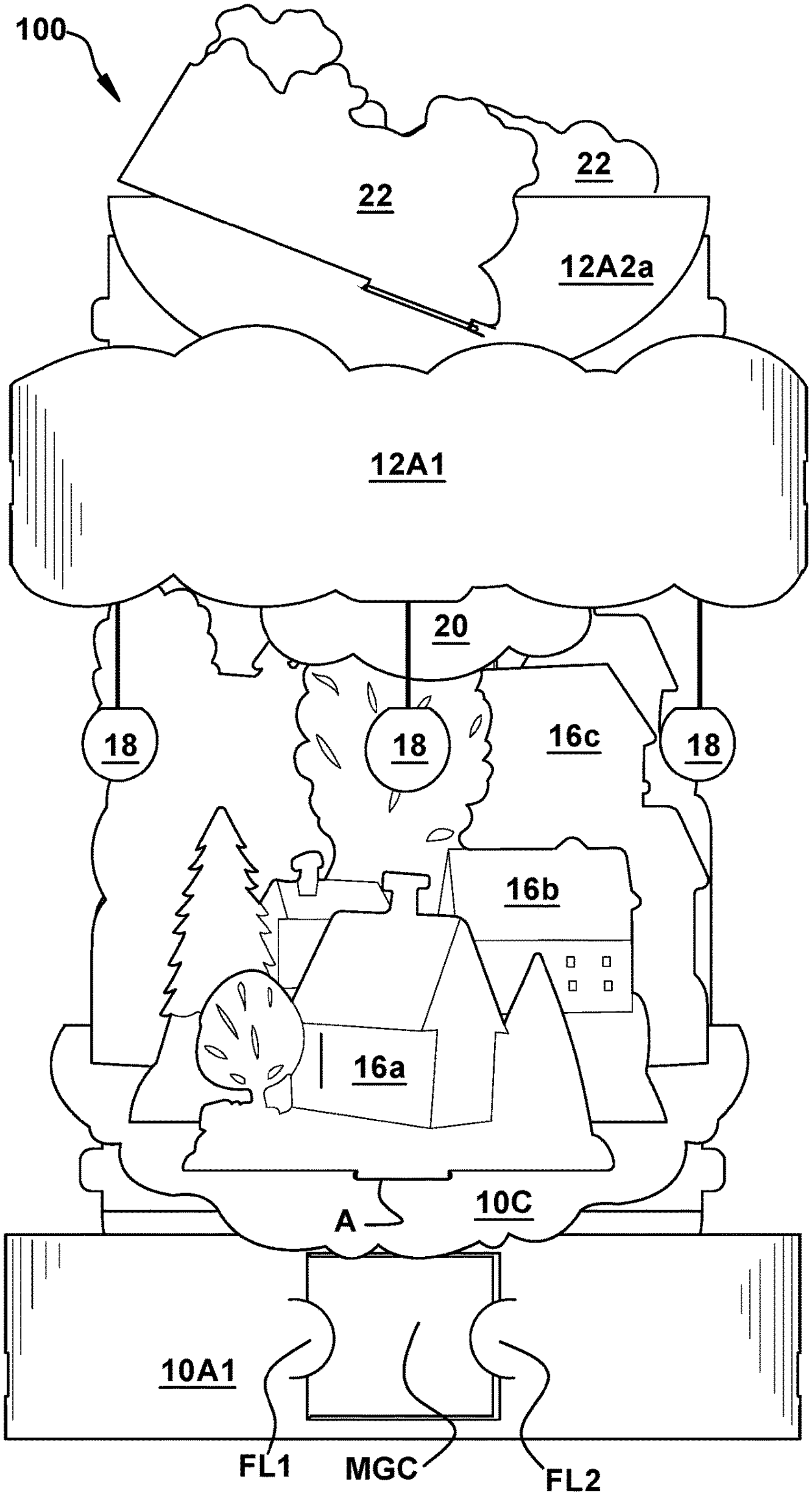
FIG. 8 is a front view of FIG. 7.
Figure 9:
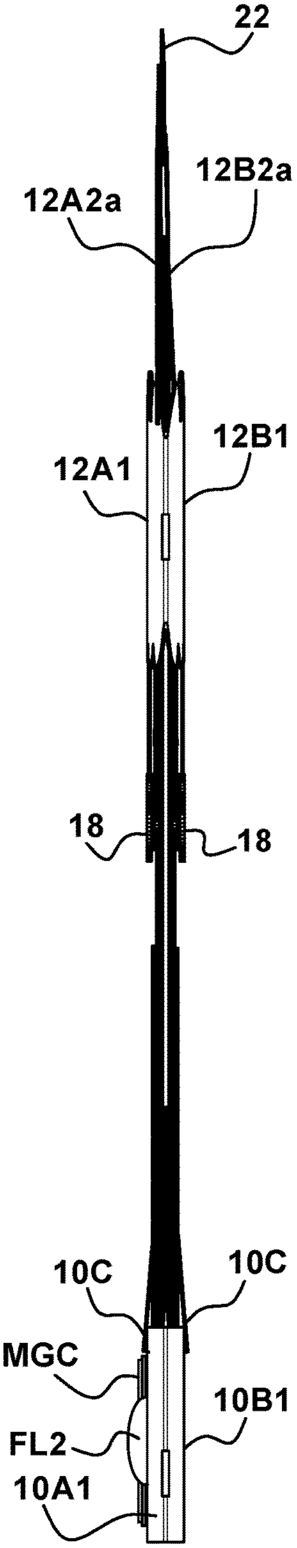
FIG. 9 is a right side view of FIG. 7.
Figure 10:
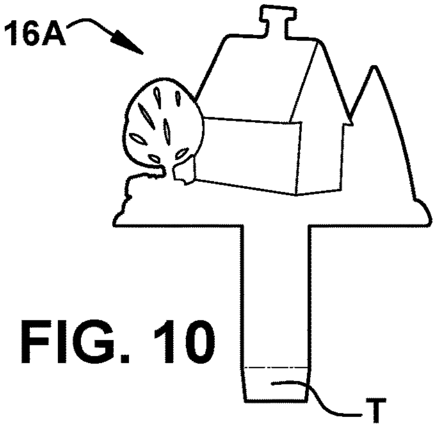
FIGS. 10 & 11 are front views of a first panel of the 3D scene.
Figure 11:
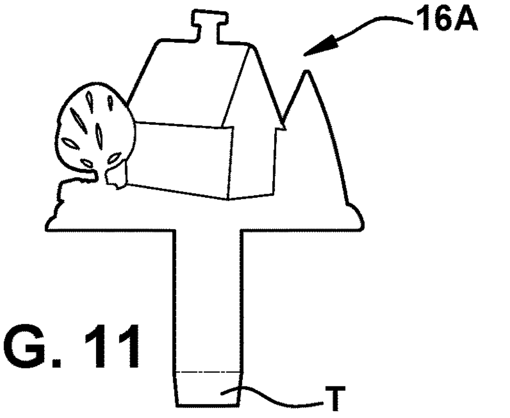
Figure 12:
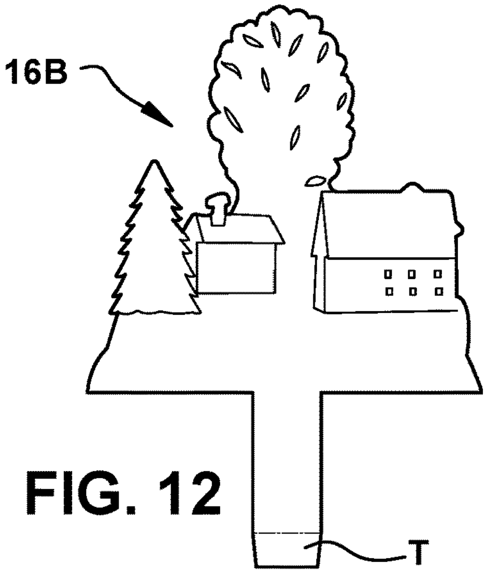
FIGS. 12 & 13 are front views of a second panel of the 3D scene.
Figure 13:
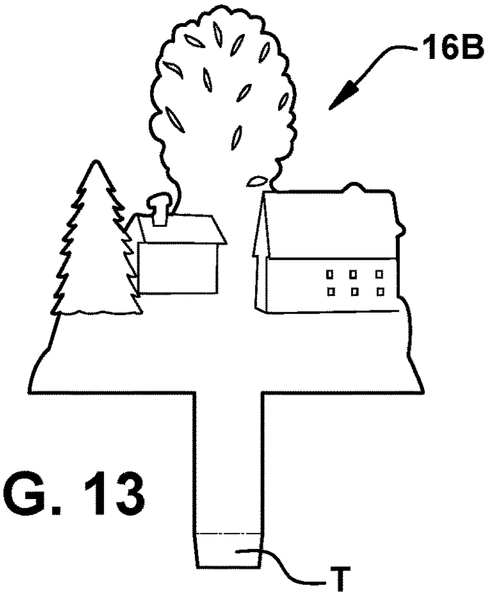
Figure 14:
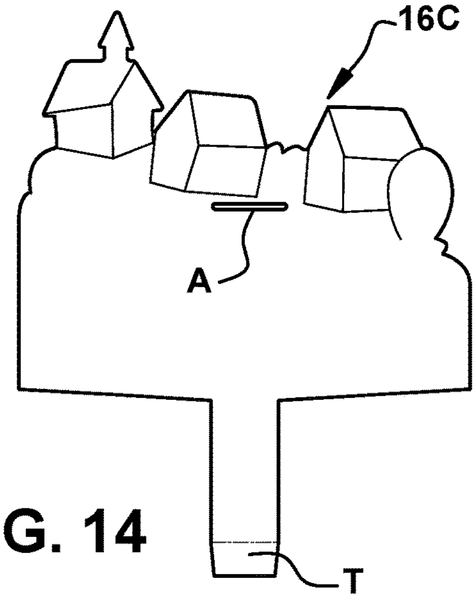
FIGS. 14 & 15 are front views of a third panel of the 3D scene.
Figure 15:
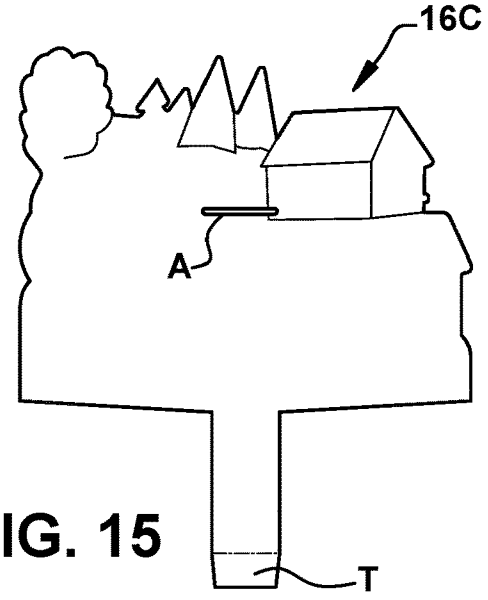

Between the lower canopy 10 and the upper canopy 12 is a pop-up scene having two or more pop-up scene panels 16 and one or more dangling or hanging panels 18 which are suspended from the upper canopy 12. A main or central pop-up scene panel 16M extends between the lower canopy 10 and the upper canopy 12 at the horizontal center thereof, as shown in FIG. 4. Each pop-up scene panel 16 has a front surface and a rear surface and may be shaped in various different configurations, widths and heights.

In the embodiment shown in the Figures, there are three (3) sets of two (2) pop-up scene panels. The two (2) pop-up scene panels within each set are identical, as shown in FIGS. 10-15. The two identical pop-up scene panels from each set of panels are placed on opposing sides of the main pop-up scene panel 16M, as shown in FIG. 4. The placement of each of the three (3) pop-up panels on each side of the main pop-up scene panel 16M are placed in the same order with the longest panels being positioned closest to the main pop-up scene panel 16M and the remaining panels being positioned thereafter in descending height so that at least a portion of each pop-up panel 16 can be seen when looking at the pop-up from a front or rear view. The pop-up scene panels 16 also create depth within the pop-up scene. In other embodiments, the pop-up scene panels 16 on each side of the main pop-up scene panel 16M are not identical and can show different scenes (having different designs, shapes, and heights). The embodiment discussed herein and shown in the figures, as being double-sided with the same identical scene on each opposing side of the main pop-up scene panel 16M is but one example of how the pop-up scene panels can be shaped and arranged but other arrangements of the panels (one-sided, two different scenes on each side, etc.) have been contemplated and are considered to be within the scope of the present invention.

The main pop-up scene panel 16M, as shown in FIG. 20, is elongate panel bisected by fold line F25, creating two sub-panels 16M1 and 16M2. Both sub-panels 16M1, 16M2, contain an opening A at the approximate vertical center thereof. Sub-panel 16M1 is attached at one side to a flap panel FL1 along fold line F24. Sub-panel 16M2 is attached at one side to a flap panel FL2 along fold line F26. The main pop-up scene panel 16M is folded along fold line F25 such that sub-panels 16M1 and 16M2 are in direct contact with one another in a stacked arrangement, one atop the other. The main-pop-up scene panel 16M is attached to the lower canopy 10 by inserting a portion of the main pop-up scene panel 16M proximate to the lower edge thereof, into the major opening AM located on the top panel 10C of the lower canopy 10 and gluing the inserted portion of the main pop-up scene panel 16M between lower canopy 10 panels 10A3 and 10B3. The main-pop up scene panel 16M is attached to the upper canopy 12 by gluing a portion of the main pop-up scene panel 16M, proximate to an upper edge thereof, between upper canopy 12 panels 12A2*b* and 12B2*b*.

A strut or slotted tab ST, as shown in FIG. 22, is used to facilitate spacing and attachment of one or more pop-up scene panels 16 between and to another pop-up scene panel 16 and/or to the main pop-up scene panel 16M. The slotted tab ST, in the embodiment shown in FIG. 22, contains three (3) slots on each long side of the of the slotted tab ST. It also contains two connection tabs T10, T11, located at opposing short sides of the slotted tab ST. The slotted tab ST is inserted into the opening at the approximate vertical center of the main pop-up scene panel 16M (see FIG. 20) such that the slotted tab ST intersects with main pop-up scene panel 16M at the center slot CS. The slotted tab is also inserted into the slot A located on panel 16C (see FIGS. 14 and 15) such that the slotted tab ST intersects panel 16C at slot A. The slotted tab ST is folded downward along fold lines F22, F24 and tabs T10 and T11 are glued to the inside surface of panel 16B. Pop-up scene panels 16M (FIG. 20), 16C (FIGS. 14 & 15), and 16B (FIGS. 12 & 13) are all connected via the slotted tab ST. This connection facilitates proper order, spacing and functionality during the folding and unfolding of the pop-up structure 100. While this strut or slotted tab ST has been disclosed herein and shown in the figures, it is only done so as one example of how the pop-up scene panels 16 can be attached and spaced apart from one another. Other spacing mechanisms, such as tabs or other mechanisms may be used in place of the strut or slotted tab ST.

Each pop-up scene panel 16 contains a tab member T thereon which facilitate attachment of the pop-up scene panels 16 to the lower canopy 10. The tab members are inserted into one of the three (3) openings A on each of the subpanels 10C1 and 10C2 of the top panel 10C of the lower canopy 10 (see FIG. 16). The pop-up scene panels 16 may also have additional openings, slots and/or attachment tabs thereon, which may facilitate attachment of the pop-up scene panels 16 to the lower 10 or upper 12 canopy or to another pop-up scene panel 16. These openings A, slots SL and/or tabs T may correspond to the various openings A, slots SL and/or tabs T located on the various subpanels making up the lower 10 and upper 12 canopy structures.

One or more hanging panels 18, shown in FIG. 18, are suspended from the upper canopy 12 to add movability or a motion element to the pop-up 100. Each hanging panel 18 is attached to a suspension element, such as wire, twine, fishing line, or any other such material. This material is then glued (or otherwise attached) to a portion of the upper canopy 12. When the pop-up 100 is in the unfolded, 3D configuration, the hanging panels 18 can dangle, sway or otherwise move independent of the remaining portions of the pop-up 100. While the embodiment described herein and shown in the Figures contains hanging panels attached to a suspension element, other embodiments may have hanging panels made of paperboard (or other material) with partial insertion of said paperboard (or other material) into a portion of the upper canopy wherein it can move freely, independent of the other elements of the pop-up 100. In the embodiment shown in the Figures, the hanging panels 18 have a circular shape (once folded and glued together), as seen in FIG. 18. In other embodiments, the hanging panels 18 can take on different shapes/forms.

Additional panels may also be attached to the lower canopy 10, upper canopy 12, and/or the pop-up scene 16. For example, as shown in the figures, decorative panels 19 and 22 are inserted into openings A contained on the round/oval panels 12A2, 12B2 of the upper canopy 12. These decorative panels 19, 22 provide additional depth and 3-dimensionality to the pop-up scene.

In operation, the pop-up object with double canopy of the present disclosure and related inventions, is folded into a substantially flat, collapsed position. The pop-up can be neatly placed into an envelope for presentation to a recipient. Once the recipient removes the pop-up from the envelope, it can be unfolded into a 3D, upright position by placing downward pressure on the upper canopy until the protrusions on the sides of the upper canopy are inserted into the slots on the upper canopy and the protrusions on the sides of the lower canopy are inserted into the slots on the lower canopy. The pop-up can remain in the 3D, upright position and placed onto a table or other flat surface for display. It can be moved from the second 3D, upright position back to the first, substantially flat, folded position by placing the upper or lower canopy, for example, between a thumb and forefinger and pressing the upper or lower canopy onto a flat position. The pop-up can easily be stored for safekeeping in the flat, collapsed position or returned to the envelope.

While the pop-up object with double canopy of the present disclosure and related inventions is described as having a particular shape, other shapes, including linear and non-linear edge patterns. Certain materials have been described with respect to suspending the hanging panels from the upper canopy, however, other materials have been contemplated and are considered to be within the scope of this invention. While the mini greeting card has been described and shown in the figures as being attached to the lower canopy, other locations on the pop-up have been contemplated and are considered to be within the scope of this invention.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated. It is intended that the invention be defined by the following claims.

The invention claimed is:

1. A pop-up comprising
- a lower canopy;
- an upper canopy;
- a pop-up scene, a portion thereof spanning between the upper canopy and the lower canopy, the pop-up scene comprising two or more panels;
- a plurality of hanging panels suspended from the upper canopy;
- wherein the pop-up can move between a first position wherein it is folded in a substantially flat configuration and a second position, wherein it is unfolded and in a 3-dimensional configuration.

2. The pop-up of claim 1, further comprising a mini greeting card removably attached to the pop-up.

3. The pop-up of claim 1, wherein the pop-up scene contains panels of different heights.

4. The pop-up of claim 3, wherein the pop-up scene is arranged with panels in descending order.

5. The pop-up of claim 3, further comprising a strut that connects one or more panels of the pop-up scene together.

6. The pop-up of claim 1 further comprising a top panel that sits atop the lower canopy below the pop-up scene.

7. A pop-up comprising:
- a first canopy comprising an oval base, internal structure, and top panel, the first canopy movable between a first position, wherein it is folded flat and a second position wherein it is unfolded into a three-dimensional structure;
- a second canopy comprising an oval base and internal structure, the second canopy movable between a first position, wherein it is fold flat and a second position wherein it is unfolded into a three-dimensional structure;
- a center panel that extends between and separating the first canopy and the second canopy;
- a 3D scene comprising a plurality of panels attached to the first canopy;
- a plurality of hanging panels suspended from the second canopy;
- wherein the first canopy, the second canopy and the 3D scene are simultaneously moved between the first and second positions.

8. The pop-up of claim 7, further comprising a mini greeting card removably attached to the pop-up.

9. The pop-up of claim 7, wherein the plurality of hanging panels can move independent of the pop-up.

10. The pop-up of claim 7, wherein the plurality of panels of the 3D scene are arranged in order from tallest to shortest.

11. The pop-up of claim 7, wherein the plurality of panels of the 3D scene each have a different shape.

12. The pop-up of claim 7, wherein the 3D scene is double-sided, having an identical set of panels on each side of the center panel.

13. The pop-up of claim 7, wherein when the pop-up is in the second position, the first canopy can be placed onto a table or other flat surface.

14. The pop-up of claim 7, further comprising a strut that attaches two or more of the plurality of panels in the 3D scene.

15. A pop-up comprising:
- a first pop-up element;
- a second pop-up element;
- a plurality of hanging panels suspended from the second pop-up element;
- a pop-up 3D scene located between the first pop-up element and the second pop-up element;
- wherein the first pop-up element, the second pop-up element and the pop-up 3D scene each simultaneously move between a first, substantially flat, collapsed position and a second, upright, 3-dimensional position.

16. The pop-up of claim 15, further comprising a greeting card removably attached to the first pop-up element, the second pop-up element or the pop-up 3D scene.

17. The pop-up of claim 15, wherein the plurality of hanging panels can move independently of the first pop-up element, the second pop-up element and the pop-up 3D scene.

18. The pop-up of claim 15, wherein the pop-up 3D scene comprises a plurality of scene panels.

19. The pop-up of claim 18, further comprising a strut which connects one or more of the plurality of scene panels.

* * * * *